United States Patent Office 3,623,403
Patented Nov. 30, 1971

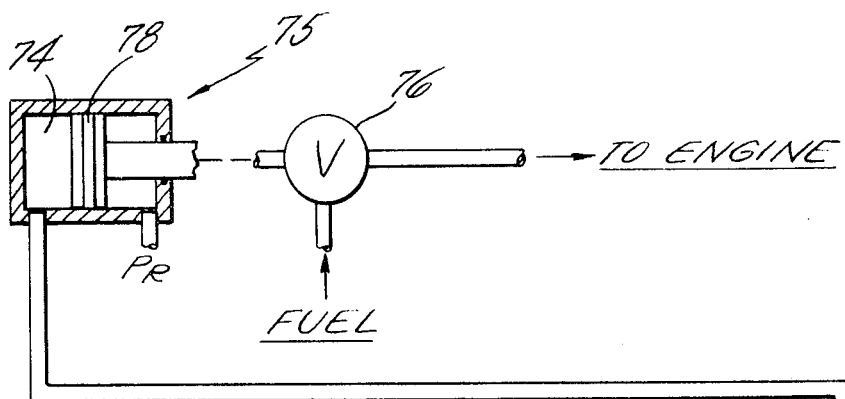
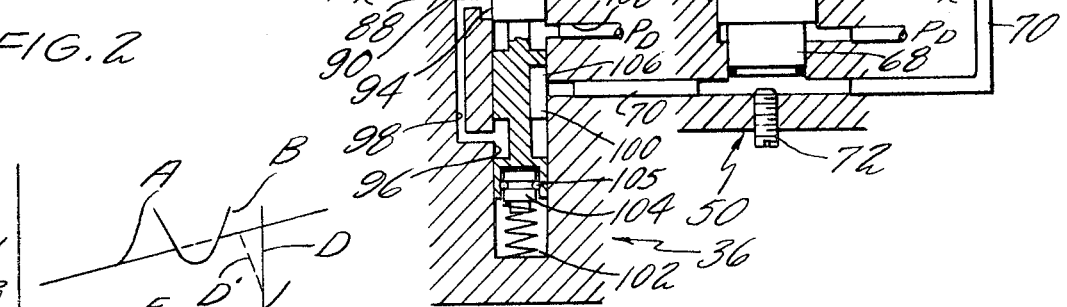
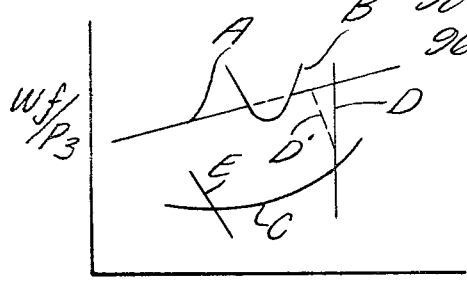

3,623,403
ISOCHRONOUS GOVERNING SYSTEM CONTROL
Lawrence S. Smith, Simsbury, Conn., assignor to United Aircraft Corporation, East Hartford, Conn.
Filed Mar. 20, 1970, Ser. No. 21,260
Int. Cl. F15b *11/15*
U.S. Cl. 91—458      11 Claims

ABSTRACT OF THE DISCLOSURE

Governing is effectuated by feeding an error signal concomitantly to an integrating valve and a proportional valve each of which provide an output signal to an output mechanism for controlling the device governed by the governing system. The proportional valve may be indexed to the error producing mechanism to anticipate the set value governed by the governing system.

CROSS-REFERENCE TO RELATED APPLICATION

This invention refers to and can be used with the jet engine fuel control system described in patent application Ser. No. 21,261 entitled "Isochronous Governing System with Acceleration/Deceleration Limiting Means," filed by D. E. Anschutz and L. S. Smith on even date with this application and assigned to the same assignee.

BACKGROUND OF THE INVENTION

While isochronous governing has in the past been desirable to achieve, it has nonetheless been supplanted in most instances by droop governing system. This is occasioned, in aircraft jet engine applications, because isochronous governing systems are inherently unstable. In order to stabilize isochronous governors, additional mechanisms are necessary, all of which add to the complexity, weight and cost of the governing system. As for example, in jet-powered aircraft fuel controls, it is well known that buffer pistons have been adapted to work with isochronous governors for assisting the stability problem.

In addition to the disadvantages noted above, because of the foreign matter carried in the fuel which goes through the buffer piston, the piston must be made exceptionally large in order to overcome the friction force so as to react when responding to a small error signal. In the heretofore known isochronous governing systems, it has been customary to vary the flow through a fixed orifice and regulate the pressure drop across the orifice as a function of speed error. Since flow through an orifice is a square function, the gain of the system is nonlinear and flow varies with viscosity changes.

I have found that I can obviate the problems stated above and provide an accurate isochronous governing system that is characterized by being less complex, lighter and less expensive than heretofore known devices. Additionally, in an isochronous speed governing system for jet engine fuel control only one speed sensor is necessary for both steady state and acceleration scheduling. Although a single speed sensor has been used in a droop governing system, it is unique with an isochronous governing system.

SUMMARY OF INVENTION

The primary object of this invention is to provide an improved isochronous governing system.

In accordance with this invention, an isochronous governor is achieved by utilizing a proportional valve and an integrating valve concomitantly operating an output device for readjusting that which is to be governed.

A still further object of this invention is to provide a speed sensor and comparing it with a speed set for producing an error signal which, in turn, drives integrating and proportional valves both of which cooperate on an output mechanism for readjusting the speed which is being sensed by the governor.

A still further object of this invention is to provide an isochronous governor with integrating and proportional valves having the proportional valve being indexed to the speed error such that the proportional valve can be set to anticipate the speed set point thereby minimizing speed overshoot and undershoot.

A still further object of this invention is to provide linkage mechanism responding to a speed error signal which permits concomitant actuation of the proportional valve and integrating valve and permitting unrestrained travel of either valve upon actuation of the linkage mechanism.

Another object of this invention is to reduce the viscosity effect resulting from changes in temperature and therefore render the system more accurate, linear and improve its gain characteristics.

Another object of this invention is to control the movement of the fuel metering valve so that it is a function of speed error together with the rate of change of said speed error.

Other features and advantages will be apparent from the specification and claims and from the accompanying drawings which illustrate an embodiment of the invention.

BRIEF DESCRIPTION OF THE DRAWING

FIG. 1 is a schematic illustration of the preferred embodiment of this invention.

FIG. 2 is a graphical illustration illustrating the operation of the schematic shown in FIG. 1.

While in its preferred embodiment this invention is utilized in a fuel control for a jet engine and governs the speed of the rotating mechanism, it is to be understood that the invention has equal utility in other applications, whether it be for a jet engine or whether it be for governing another parameter. For example, it may be desirable to govern burner pressure, engine pressure ratios or the like which can be equally accomplished without deviating from the scope of this invention.

In its preferred embodiment this invention is shown as being utilized in a fuel control for a gas turbine type of engine of the type disclosed in Pat. No. 2,822,666 granted to S. G. Best. As shown in the patent noted above, fuel flow is controlled by developing a control parameter signal which is indicative of $W_f/P_3$ wherein $W_f$ is fuel flow in pounds per hour and $P_3$ is compressor discharge pressure or burner pressure in pounds per square inch which parameter is scheduled for steady state and acceleration. For steady state, fuel flow is obtained by scheduling a signal equivalent to the ratio $W_f/P_3$ which is a function of the speed error between a given speed set point and the actual compressor speed which signal is then multiplied by actual $P_3$.

The acceleration limits which limit the amount of fuel flow to prevent overtemperature and surge schedules a $W_f/P_3$ ratio as a function of compressor inlet temperature and speed of the compressor and also is multiplied by actual $P_3$. The operation and details of this type of control system are well known as exemplified by the above-identified patents, and since it does not form a part of the invention, it is only necessary to briefly describe its operation.

To better understand this invention reference is hereby made to FIG. 2 which is a plot of the $W_f/P_3$ parameter versus compressor speed. The curve A represents the temperature limits and the curve B represents the surge limits and it is the function of the fuel control to assure that these conditions are not exceeded during acceleration of the engine. Curve C represents the steady state operating line at a given compressor inlet temperature and curve D represents the governing operating line.

Thus, the intersection between curves C and D establishes the steady state point of operation for a given airplane flying condition. As noted from FIG. 2, line D is substantially vertical which means that for any $W_f$ along the governor line, compressor speed will remain at a constant value. As is well known in the art, both the acceleration and steady state lines vary as a function of compressor inlet temperature. The purpose of the isochronous governor is to hold compressor speed constant even though there is a shift in the steady state line evidenced by a change in compressor inlet temperature. Otherwise as in the case of a droop governor, speed will be reset so as to produce the proper fuel flow for a shifting of the steady state line. This is exemplified by droop line E shown in FIG. 2 which is a typical droop schedule for a fuel control. If temperature changes to shift the steady state line, the new fuel flow requirements will require a new compressor speed setting.

Thus, in accordance with the present invention as viewed from FIG. 1, the mechanism to be described serve to control the jet engine to conform with the isochronous governing illustrated in FIG. 2. However, in this embodiment unlike the prior art patents, supra, the speed srror does not schedule $W_f/P_3$ but closes the loop on fuel flow. Therefore, it isn't necessary to multiply the $P_3$ signal as is the customary practice of scheduling steady state operating conditions. As noted, cam 10 is set by the power lever 12 for producing a signal on link 14 which is indicative of the desired speed or scheduled speed selected by the airplane pilot. The actual speed of the compressor is sensed by the speed sensor indicated in the blank box generally illustrated by numeral 16 which preferably is a flyball type disclosed in Pat. No. 2,822,666, supra, and Pat. No. 3,192,988 granted to R. D. Porter and C. F. Stearns. The speed sensor imposes an actual speed signal on link 18 rotatably supported to pivot 21 which is pivotally connected to link 14 by pivot 20. An output arm 22 connected thereto moves whenever link 14 does not line up with link 18, i.e., when there is an error between the set speed and the actual speed. Speed error is then transmitted via the dash line 26 to bellcrank 28. Arm 30 of bellcrank 28 carries a depending flange 32 which abuts against spool 34 of the integrating valve generally indicated by numeral 36. Bellcrank is rotatably secured to the pivot 38. Link 40 is likewise pivoted to pivot 38 and carries a flange 42 which, as shown in FIG. 1, abuts against flange 44 formed on arm 30. Both flanges 42 and 44 extend radially so as not to interfere with relative motion between links 30 and 40. Thus, rotation of bellcrank 28 serves to position spool 34 and flapper 46 which bear against the depending portion 48 of link 40.

Flapper 46 controls servo piston 48 of the proportional valve generally indicated by numeral 50. Flapper 46 serves to hold piston 52 of proportional valve 50 in the position shown in the drawing of FIG. 1 when link 22 is in the position shown, that is, when there is no error evidenced between set speed and actual speed. Proportional valve 50 may be a half area servo wherein piston 52 is held in the mid-position when flapper 46 is in the null position. Whenever flapper 46 is displaced, it will cause piston to move either upwardly or downwardly depending on when it moves to open or to close the jet nozzle.

As noted from FIG. 1, pressurized fluid (designated as $P_R$ in the drawing) in line 54, which is regulated at a predetermined value by a pressure regulator, not shown, is admitted into chamber 56 through restricted orifice 58 to act on the top face of piston 52. Piston 52 carries an elongated tubular member 60 which terminates in jet nozzle 62 in proximity to the flapper valve 46. The relative distance between flapper 46 and the end of nozzle 62 establishes a curtain area for controlling the pressure in chamber 56. As mentioned above the null position is when piston 52 is midway in the piston chamber. The force generated by the fluid acting on the top face of piston 52 is counterbalanced by the force acting on the shoulder 64 which is subjected to unrestricted regulated pressure regulated by the pressure regulator regulating the pressure in line 54, not shown. When flapper valve closes off jet nozzle 62, the pressure in chamber 56 builds up to the value equal to the pressure acting on surface 64 or the regulated value urging the valve downwardly causing the extension portion 68 to force the fluid out of the chamber formed therein to interline 70. Piston 52 will move until the bottom portion of the piston abuts against the set screw 72. This forces a slug of fluid into the actuating piston chamber 74 of the actuator 75 via line 70 causing the half area servo piston to actuate valve 76. Valve 76 is only schematically illustrated and serves to feed the required amount of fuel to regulate the operation of the jet engine as shown in accordance with the graph in FIG. 2.

Upon actuation of bellcrank 28, the integrating valve 36 simultaneously with the proportional valve initiates a signal to the actuator 75 in the following manner. Spool 34 which is continuously rotated in bore 80 and is driven by gear 82 by mechanism not shown, moves with bellcrank 28. Regulated pressure is admitted into integrating valve 36 through line 88, and assume valve 36 is urged downwardly, fluid enters into annular passage 90 and through bore 94 via the now displaced land 92 and communicating it into annular chamber 96 via line 98. Chopper 100 which contains a series of spaced radially extending vanes intermittently allows the flow of fluid from annular chamber 96 into passage 70 which is in communication with chamber 74 of the actuator. Flow from integrating valve 36 will continue until the error signal is returned to its null value, i.e., when links 14 and 18 line up. Spool valve 34 is spring loaded in the upward position by spring 102 which is retained by retainer 104 rotatively supported by bearing 105 in the recess at the bottom of spool 34. In the opposite direction, that is, when the polarity of the error is in the reverse sense, bellcrank 28 will be rotated counterclockwise about pivot 38 permitting the valve spool 34 to move in the upward direction. This communicates line 70 via annular passage 106 into drain line 108 draining fluid from actuator chamber 74 and positioning the piston 78 to the left for reducing the flow of fuel to the engine.

It will be noted that when the engine is adjusting in response to the governor to rectify the error, the integrating valve is continuously moving. Since the integration rate is established by the metering area established by land 92 and port 90, the integration rate is a function of valve position and valve position is a function of speed error. The overall effect is to improve the gain of the system and make the system independent of viscosity changes that result with temperature changes.

In addition since the bellcrank 28 is indexed to the error linkages, that is, links 14 and 18, and since adjustable stops 72 and 73 determine the stroke of piston 52, they can be adjusted to anticipate the point when the integrating valve is approaching the set speed. This is better understood by referring to the graph depicted in FIG. 2. The dash line D' illustrates when the scheduling transition occurs between governing and acceleration. Instead of following the governor line D, the anticipation aspect controlled by the proportional valve permits the scheduling to follow dash line D' until it intersects the governor line D. Thus, before the integrating valve returns to the null position the proportional valve begins to stroke at some predetermined percentage of speed error and to reduce $W_f$ before the set speed is reached so as to prevent overshooting or undershooting.

It will also be noted as shown in FIG. 1 that when links 14 and 18 are nulled out and there is no speed error, link 40 and arm 30 of bellcrank 28 assume the position as shown. However upon an error signal once link 40 actuates flapper 46 in the downward direction, arm 30 will continue to travel and flanges 42 and 44 will separate. In the upward direction arm 30 will displace link 40 and move flange 48 away from flapper 46. In both directions, it is therefore apparent that once proportional valve 50 is actuated, integrating valve will continue its stroke until the error is wiped out.

It should be understood that the invention is not limited to the particular embodiments shown and described herein, but that various changes and modifications may be made without departing from the spirit or scope of this novel concept as defined by the following claims.

I claim:

1. An isochronous governor for controlling a condition at a constant value comprising, in combination,
   actuator means movable to a position for changing said condition,
   control means for positioning said actuator means as a function of an error between said condition and a predetermined setting of said condition and the rate of change of said error,
   said control means including a speed sensor for generating an error signal indicative of said condition and a predetermined setting of said condition,
   integrating valve means responsive to said error signal for controlling said actuator means as a function of the integral of said error signal,
   proportional means including valve means also responsive to said error signal for further controlling said actuator means as a function of a value proportional to said error signal,
   said proportional means having a piston movable to a first and second position, said piston being fixed at a point intermediate said first and second position when said means for generating an error signal produces a signal equal to zero,
   means for anticipating said predetermined setting including adjustable stops disposed adjacent to either end of said piston whereby when said piston is displaced to either the first or second position it returns to said fixed point at a predetermined percentage of said error signal.

2. An isochronous governor as claimed in claim 1 wherein said actuator includes a hydraulically actuated piston, connection means leading fluid to and from said hydraulically actuated piston, said proportional means and said integrating means controlling the flow of fluid to said hydraulically actuated piston, and said piston of said proportional means being movable to insert or remove a predetermined quantity of fluid to and from said hydraulically actuated piston.

3. An isochronous governor as claimed in claim 2 wherein said integrating means continuously meters fluid to said hydraulically actuated piston until the value of said error signal produced by said means for generating said error equals zero.

4. An isochronous governor as claimed in claim 2 wherein said piston of said proportional means being a half area servo piston and servo control means for positioning said piston.

5. An isochronous governor as claimed in claim 1 wherein said control means includes linkage means being positioned by an input indicative of a desired setting of said condition and another input indicative of the actual condition for producing an output indicative of the difference of said desired setting and said actual condition.

6. An isochronous governor as claimed in claim 1 wherein said linkage means includes a fulcrummed lever and a link pivoted at one end of said fulcrummed lever.

7. An isochronous governor as claimed in claim 6 wherein one end of said fulcrummed lever bears against a mechanically actuated cam.

8. An isochronous governor as claimed in claim 5 including a bellcrank having one arm attached to said output and an arm bearing against said integrating means.

9. An isochronous governor as claimed in claim 8 including a lever pivotally attached to said bellcrank and controlling said proportional means.

10. An isochronous governor as claimed in claim 9 including complementary flanges on said bellcrank and said lever and resilient means for holding said flanges in contact for at least a portion of the displacement of said bellcrank and said lever.

11. An isochronous governor adapted to hold the rotational speed of a rotary member of a jet engine comprising a throttle valve for metering the flow of fuel to said engine, an actuator for positioning said throttle valve, control means responsive to a predetermined speed setting and the actual speed for controlling said actuator for producing a speed error signal, and said control means including integrating means for controlling said actuator as a function of the rate of change of said speed error signal and proportional means for controlling said actuator proportionally to said speed error signal, said proportional means including a piston for adding a predetermined amount of fluid to or removing a predetermined amount of fluid from said servo chamber and said integrating means includes valve metering means for continuously leading fluid into or removing fluid from said servo chamber whenever said output signal is present, and said proportional means having means to anticipate when said speed error signal approaches zero by removing said predetermined amount of fluid or adding said predetermined amount of fluid to said servo chamber at a predetermined percentage of said speed error signal.

References Cited

UNITED STATES PATENTS

| | | | |
|---|---|---|---|
| 3,139,894 | 7/1964 | Strebinger | 60—39.28 |
| 3,007,448 | 11/1961 | Erikson | 91—458 X |
| 3,148,501 | 9/1964 | Oldenburger | 91—458 X |
| 3,071,009 | 1/1963 | Stearns | 91—366 X |
| 3,225,814 | 12/1965 | Capwell | 60—39.28 X |

CLARENCE R. GORDON, Primary Examiner

U.S. Cl. X.R.

60—39.28